(12) United States Patent
Janssen

(10) Patent No.: US 6,560,529 B1
(45) Date of Patent: May 6, 2003

(54) METHOD AND DEVICE FOR TRAFFIC SIGN RECOGNITION AND NAVIGATION

(75) Inventor: Holger Janssen, Hameln (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,163

(22) PCT Filed: Jun. 2, 1999

(86) PCT No.: PCT/DE99/01628
§ 371 (c)(1),
(2), (4) Date: Mar. 14, 2001

(87) PCT Pub. No.: WO00/16214
PCT Pub. Date: Mar. 23, 2000

(30) Foreign Application Priority Data

Sep. 15, 1998 (DE) .......................................... 198 42 176

(51) Int. Cl.[7] .............................................. G01C 21/00
(52) U.S. Cl. .................... 701/200; 701/207; 701/208; 340/988
(58) Field of Search ................................ 701/200, 207, 701/208, 209, 210, 213, 215, 223; 348/119; 340/988

(56) References Cited

U.S. PATENT DOCUMENTS

| 5,296,852 A | | 3/1994 | Pathi ........................... 340/933 |
| 5,374,932 A | | 12/1994 | Wyschogrod et al. ......... 342/36 |
| 5,633,944 A | * | 5/1997 | Guibert et al. .............. 382/100 |
| 5,739,848 A | * | 4/1998 | Shimoura et al. ........... 348/119 |
| 5,844,505 A | * | 12/1998 | Van Ryzin .................. 340/988 |
| 5,925,090 A | * | 7/1999 | Poonsaengsathit .......... 701/211 |
| 6,018,697 A | * | 1/2000 | Morimoto et al. .......... 701/209 |
| 6,032,098 A | * | 2/2000 | Takahashi et al. .......... 701/210 |
| 6,285,393 B1 | * | 9/2001 | Shimoura et al. ........... 348/119 |

FOREIGN PATENT DOCUMENTS

DE            40 23 952 C2    6/1992

* cited by examiner

Primary Examiner—William A. Cuchlinski, Jr.
Assistant Examiner—Marthe Y. Marc-Coleman
(74) Attorney, Agent, or Firm—Michael J. Striker

(57) ABSTRACT

A method and a coupled system for road sign recognition and for navigation is proposed, which enables a bidirectional data transmission between the road sign recognition device and the navigation device.

5 Claims, 1 Drawing Sheet

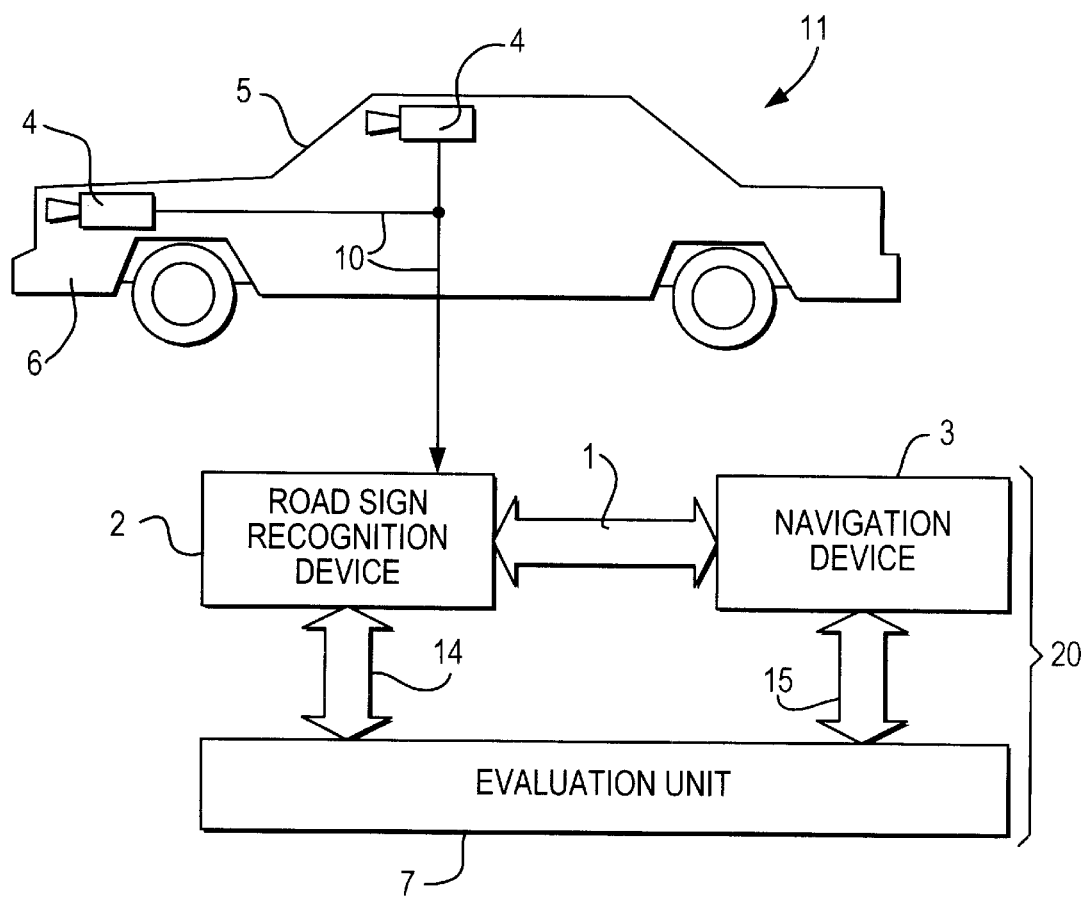

METHOD AND DEVICE FOR TRAFFIC SIGN RECOGNITION AND NAVIGATION

BACKGROUND OF THE INVENTION

The invention is based on a road sign recognition device and a method for recognizing road signs. From German Patent DE 40 23 952 C2 a road sign recognition device is already known in which an image processing method is employed for the road sign recognition.

SUMMARY OF THE INVENTION

The method of the invention and the apparatus of the invention have the advantage over the prior art that by coupling a road sign recognition device with a navigation device, information can be exchanged between the two systems, and as a result the data ascertained by the two systems can supplement one another, which in turn contributes to enhancing the safety and reliability of each of the systems coupled to one another. This is especially important for instance if interventions are to be made into the speed controller of the vehicle or the like by way of the coupled system; failure to recognize road signs, or recognizing them incorrectly, would mean significant danger to the vehicle driver and to the vehicle itself.

BRIEF DESCRIPTION OF THE DRAWING

FIG. 1 is a view schematically showing an apparatus for road sign recognition and for navigation in accordance with the present invention; and FIG. 2 is a view showing a process flow diagram illustrating various steps of the inventive method for road sign recognition and for navigation.

DESCRIPTION OF THE PREFERRED EMBODIMENT

FIG. 1 shows a coupled system 20 for road sign recognition and navigation, which can for instance be built into a motor vehicle 11. The coupled system 20 includes a device 2 for road sign recognition, which is coupled via data exchange lines 1 to a device 3 for navigation. The device 2 for road sign recognition is connected via sensor lines 10 to vehicle area sensors 4

The vehicle area sensors, such as cameras, are installed for instance in the region of the windshield 5 or in the front region 6 near the front headlights or the bumper. The devices 2 and 3 communicate with an evaluation unit 7 via further data lines 14 and 15.

The device 2 is used for road sign recognition, and in particular for furnishing road sign recognition data. The device 3 for navigation serves to furnish navigation data, for instance by way of digital road maps stored in a memory; these navigation data include for instance the position and current road type. Via the data exchange lines 1, the device for navigation can communicate data to the road sign recognition device 2, in order to supplement the road sign recognition data. Examples of data communicated by the navigation device are:

1. Reporting the current road type, such as city street, country road, Autobahn, country lane, and so forth; this can contain context information that for instance indicates the maximum allowed vehicle speed for a type of road.

2. Reporting the change of the vehicle to a new road type or its turning onto a new road, such as a change from a country road to a federal road or the like; as a result of this change, the validity of certain road signs, such as speed limits, is thus cancelled.

3. Reporting when entering and leaving a town. The speed limits are as a rule enforced more strongly inside a town than outside city limits. This can be taken into account in reports made by the road sign recognition system to the driver.

4. Communicating streets running parallel to the current street or road. As a result, the validity of the road signs set up beside a street extending parallel can be blanked out from the current street by the device for road sign recognition. Because of the coupling between road sign recognition and the navigation system, the relevance of the road signs recognized by the device for road sign recognition can be assessed. This enhances the quality of road sign recognition. A reverse order of information flow is also provided, in which the device for road sign recognition communicates information to the device 3 for navigation, via the data exchange lines 1. For example, the recognition of the danger sign "construction site" can be named, in which the course of the road may have changed because of the construction site and no longer matches the data of the digital map in the navigation system. In particular, the navigation device 3 contains a map memory for storing digital map data in particular, as well as comparison means for comparing the road sign recognition data, which are transmitted from the device for road sign recognition, with the map data. As a result, if there are deviations, a warning can be made to the vehicle driver. In each case, the knowledge of the construction site can be taken into account in reports made by the navigation system to the driver. Conversely, the device for road sign recognition can have a data buffer for temporary storage of data communicated by the navigation device. These data include for instance the current road type, the number of lanes in the road, the width of the roadway, leaving or entering a town, dangers such as a sharp curve at a great distance, implicit cancellation of the validity of road signs because of a change of road, the existence of streets adjacent the current street, entrance and exit lanes, merging lanes, crossings of roadways, intersections, bridges, and footpaths and bicycle paths. If deviations are detected via the comparison means, which for instance is disposed in the device for navigation 3, then errors detected in the digital road map can also be stored in a suitable data medium, so that the next time the vehicle travels through the defective place, the new course of the road will be available. The new course of the road includes for instance the presence of a new construction site or the presence of an altered road sign. The evaluation unit 7 is used to furnish driver information from the navigation data and the road sign recognition data. Upon reports of information by the navigation system to the driver, information from the road sign recognition device is also taken into account, and/or the database of the navigation system is corrected and/or supplemented, as already noted above. The evaluation unit 7 can selectively generate control signals for intervention into a vehicle controller from the coupled system of a road sign recognition system and a navigation system as well. Control signals here include for instance signals for an electronic vehicle brake, an electronic gas pedal and/or for a steering angle controller and/or for triggering a cruise control. The evaluation unit can furthermore ascertain a currently valid speed limit from the road sign recognition data and the navigation data. The evaluation unit is either a separate component of the coupled system 20, or a constituent part of the devices 2 and/or 3. The device 2, the device 3, and the device 7 can also be totally integrated into a single unit.

The device for road sign recognition can, for Instance, be a video system. A device 2 using a radio system or a laser scanning system can also be employed. A prerequisite of radio methods is that road signs have a built-in, road-sign-specific transmitter, which transmits signals that the road sign recognition device of the vehicle is capable of receiving. In all cases, the information about road signs recognized can be imparted to the driver in a suitable way, for instance acoustically or also optically through warning signals The device 3 for navigation for the driver or vehicle guidance, for instance, includes a memory, in which the location of streets and roads and other information are stored in digital maps. Finding the position of the vehicle within this digital map is typically achieved by a satellite-base positioning method (GPS, for global positioning system), and a GPS module that employs this method is integrated with the navigation device 3.

FIG. 2 shows a process flow diagram which illustrates various steps of the method for road sign recognition and for navigation, described herein above.

What is claimed is:

1. A method of recognizing road signs in surroundings of a vehicle and for navigating the vehicle, comprising the steps of recognizing road signs and preparing road sign recognition data; furnishing navigation data for locating the vehicle via a satellite-base positioning system; evaluating in the vehicle in a manner selected from the group consisting of evaluating the navigation data for updating and/or supplementation with the road sign recognition data, evaluating the road sign recognition data for their supplementation with the navigation data, and both; comparing the road sign recognition data with the navigation data and if there is a deviation, providing an action selected from the group consisting of a warning issued to a vehicle driver, updating the navigation data or the road sign recognition data, and both; comparing the road sign recognition data with the navigation data and if there is a deviation, storing information relating to said deviation for future use; and employing a system selected from the group consisting of a video system, a laser scanning system, and a radio system, if road sign-specific transmitters that can be received by a road sign recognition device of the vehicle are built into the road signs.

2. A method as defined in claim 1 further comprising using the data that supplements the navigation data, selected from the group consisting of a current road type, a number of lanes in a road, a width of a roadway, entering or leaving a town, signs indicating danger, an implicit cancellation of a validity of road signs because of a change of road, an existence of roads adjacent to a current road, entrance and exit lanes, merging lanes, intersecting roadways, intersections, bridges and footpaths and bicycle paths; and using for processing the road sign recognition data also the supplementary data, so that road signs recognized are reported to the vehicle driver only within a context of a current traffic situation.

3. A method as defined in claim 1 further comprising ascertaining a currently valid speed limit for the road sign recognition and the navigation data.

4. A method as defined in claim 1 further comprising generating control signals for intervention into a vehicle controller from data selected from the group consisting of the navigation data, the road sign recognition data, and both.

5. A method as defined in claim 4 further comprising using the control signals for triggering at least one unit selected from the group consisting of a vehicle brake, a fuel delivery device of the vehicle to a drive assembly, a steering device, and a vehicle speed monitoring device.

* * * * *